US008355751B2

(12) United States Patent
Dietz et al.

(10) Patent No.: US 8,355,751 B2
(45) Date of Patent: Jan. 15, 2013

(54) AUTOMATIC ACTIVATION OF SPEED MEASUREMENT IN MOBILE DEVICE BASED ON AVAILABLE MOTION INDICIA

(75) Inventors: David Blaine Dietz, Waterloo (CA); Nagula Tharma Sangary, Waterloo (CA); Sean Bartholomew Simmons, Waterloo (CA); Mihal Lazaridis, Waterloo (CA); Jonathan Cyril Skilton Doll, Waterloo (CA); Perry Jarmuszewski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 438 days.

(21) Appl. No.: 12/388,006

(22) Filed: Feb. 18, 2009

(65) Prior Publication Data
US 2010/0210301 A1 Aug. 19, 2010

(51) Int. Cl.
*H04M 1/00* (2006.01)
(52) U.S. Cl. ...................................... 455/556.1; 455/565
(58) Field of Classification Search .................. 455/418, 455/419, 456.4
See application file for complete search history.

(56) References Cited

U.S. PATENT DOCUMENTS

| 5,940,027 | A | 8/1999 | Forseth et al. |
|---|---|---|---|
| 6,950,664 | B2 | 9/2005 | Chen et al. |
| 7,359,713 | B1 | 4/2008 | Tiwari |
| 2003/0129995 | A1 | 7/2003 | Niwa et al. |

(Continued)

FOREIGN PATENT DOCUMENTS
WO 99/39539 A1 9/1999

OTHER PUBLICATIONS

Bin Zhou and Steven Bolstein, "Mobile Velocity Estimation in Multipath Fading Channels" Queen's University Master's Thesis Submission Jun. 1999, located at the URLs http://citeseerx.ist.psu.edu/viewdoc/summary? doi=10.1.1.9.659 and http://citeseer.ist.psu.edu/zhou99mobile.html (Accessed Sep. 16, 2008). Now available at the URLs http://citeseerx.ist.psu.edu/viewdoc/summary?doi=10.1.1.68.9664 and http://library.queensu.ca/research/databases/record/2837(Accessed May 11, 2009).

(Continued)

*Primary Examiner* — Shawki Ismail
*Assistant Examiner* — Jany Tran
(74) *Attorney, Agent, or Firm* — Ridout & Maybee LLP

(57) ABSTRACT

A system and method for speed measurement of a mobile device, using an speed sensor such as a satellite navigation system or an accelerometer, does not need such speed sensor to be continually activated. The system and method make use of a monitor for monitoring at least one motion indicium for indicating that the speed of the mobile device is above an initial threshold, including but not limited to: monitoring the Doppler shift measurements of a timing signal; monitoring the timing advance of a cellular radio signal; monitoring the number of base stations visible to the mobile device; monitoring the frequency of base station handover, however determined; monitoring the level crossings and/or the autocorrelation of an RSSI signal; and/or triangulation of the position of the mobile device. When the monitor determines that the mobile device may be travelling in excess of a threshold speed, a speed sensor is activated to confirm the indication. If the speed sensor determines that the mobile device is travelling at a speed below a second threshold, the speed sensor is deactivated.

35 Claims, 5 Drawing Sheets

U.S. PATENT DOCUMENTS

| | | | |
|---|---|---|---|
| 2005/0255874 A1 | 11/2005 | Stewart-Baxter et al. | |
| 2006/0119508 A1 | 6/2006 | Miller | |
| 2007/0004413 A1* | 1/2007 | Mahajan et al. | 455/441 |
| 2007/0026850 A1 | 2/2007 | Keohane et al. | |
| 2007/0072553 A1* | 3/2007 | Barbera | 455/67.11 |
| 2007/0165583 A1* | 7/2007 | Pecen | 370/338 |
| 2008/0064446 A1 | 3/2008 | Camp et al. | |
| 2008/0234935 A1 | 9/2008 | Wolf et al. | |
| 2009/0240464 A1* | 9/2009 | Dietz et al. | 702/143 |

OTHER PUBLICATIONS

Michael J. Chu and Wayne E. Stark, "The Effect of Mobile Velocity on a Communication System Operating Over Multipath Fading Channels" University of Michigan at Ann Arbor located at the URL http://citeseer.ist.psu/edu/349491.html (Accessed Sep. 16, 2008). Now available at URL http://citeseerx.ist.psu.edu/viewdoc/summary? doi=10.1.1.38.8914 (Accessed May 11, 2009).

Michael J. Chu and Wayne E. Stark, "Effect of Mobile Velocity on Communications in Fading Channels" IEEE Transactions on Vehicular Technology, vol. 49, No. 1, Jan. 2000, located at the URL http://cat.inist.fr/? aModele=afficheN&cpsidt=1258645 (Accessed Sep. 16, 2008). Now available at http://citeseerx.ist.psu.edu/viewdoc/summary?doi=10.1.1.24.6247 (Accessed May 11, 2009).

G. Park, T. Yu, D. Hong and C. Kang, Abstract of "A Modified Covariance-Based Velocity Estimation Method for Rician Fading Channel" IEEE 59th Vehicular Technology Conference, 2004, vol. 2 p. 1144-1147 located at the URL http://cat.inist.fr/?aModele=afficheN&cpsidt=17805578 (Accessed Sep. 16, 2008). Now available at the URL http://ieeexplore.ieee.org/xpl/freeabs_all.jsp?arnumber=1389011 (Accessed May 11, 2009).

Goohyun Park, Sangho Nam, Takki Yu, Daesik Hong and Changeon Kang, "A modified covariance-based mobile velocity estimation method for Rician fading channels", Communications Letters, IEEE vol. 9, Issue 8, p. 706-8, Aug. 2005 located at the URL http://ieeexplore.ieee.org/iel5/4234/32148/01496589.pdf?arnumber=1496589 (Accessed Sep. 16, 2008 and available May 11, 2009).

E. Karastergios, M.A.K. Sumanasena and B.G. Evans, Abstract of "Mobile velocity estimator for Ricean fading channels", Electronics Letters, IEEE vol. 38, Issue 25, p. 1723-25, Dec. 5, 2002 located at the URL http://ieeexplore.ieee.org/iel5/2220/25380/01137489.pdf?arnumber=1137489 (Accessed Sep. 16, 2008 and available May 11, 2009).

"GPS Tracking USA" located at the URL http://www.gpstrackingusa.com/ (Accessed Sep. 16, 2008 and available May 11, 2009).

"Instructables—Motion Activated Cell Phone Tracker" located at the URL http://www.instructables.com/id/Motion-Activated-Cell-Phone-Tracker (Accessed Sep. 16, 2008 and available May 11, 2009).

"Timing Advance" located at the URL http://wikipedia.org/wiki/Timing_advance (Accessed Sep. 16, 2008 and available May 11, 2009).

Office Action from corresponding Chinese Patent Application No. 201010138269.8: dated Feb. 28, 2012; (including English translation); 13 pages.

* cited by examiner

AUTOMATIC ACTIVATION OF SPEED MEASUREMENT IN MOBILE DEVICE BASED ON AVAILABLE MOTION INDICIA

RELATED DISCLOSURES

Not Applicable.

INTRODUCTION

It is generally beneficial to know when a mobile communications device is in motion and at what speed. For example, the knowledge of the speed of mobile devices has many uses in the wireless industry. Such knowledge may be used to better characterize the radio channel. Accurate channel characterization plays an important role in determining data rate selection in future wireless networks and can assist with optimization techniques if the radio channel.

Additionally, a driver safety feature may be activated upon determining that a mobile device is moving in excess of a threshold speed, which may, if configured, disable some features of the device that are considered to be distracting to an operator of a motor vehicle, such as accepting input at an input device or generating output at an output device of the mobile device.

While satellite navigation systems such as GPS are becoming increasingly more common in mobile devices and provide accurate speed measurement, when activated, they consume considerable power (one estimate is that a receiver may draw up to 40 mA), which is generally at a premium in mobile devices. If activated on a full-time basis, the standby time of a mobile device could be limited to a few hours, which is generally considered to be undesirable from a user point of view.

Radio-based motion sensing methods such as triangulation or counting the number of handoffs of a call between base stations, on the other hand, rely on information that is routinely gathered by the mobile device during its normal operation, so that power consumption is not typically a concern.

However, such methodologies are generally not very accurate and may result in a considerable number of false alarm conditions. False negative situations, in which the mobile device was actually in motion but not detected by such methodologies may be problematic in that any contemplated measures in response to motion of the mobile device may not be initiated.

However, even false alarms of the false positive variety could be problematic in that the perceived effectiveness of such measures may be artificially reduced.

Commonly assigned U.S. patent application Ser. No. 12/050,351 filed on Mar. 18, 2008 by Dietz et al. and entitled "Estimation of the Speed of a Mobile Device", the text of which is incorporated by reference in its entirety herein, discloses a mobile device that is configured to estimate the speed at which it is moving. The mobile device includes a timing component configured to perform a plurality of Doppler shift measurements on a timing signal received by the mobile device and also includes a processing component configured to correlate the size of the range of the Doppler shift measurements to the speed at which the mobile device is moving.

While useful in situations where satellite navigation capability is not available on the mobile device, such methodologies are problematic in that they tend to trigger false alarms, particularly of the false positive variety. For example, an environmental change or a mobile device situated in a stationary car parked at the side of the road at an intersection at which two buses approach and cross in front of it, may very well incorrectly result in an indication of movement on the part of the mobile device.

Other attempts have been made to determine mobile speed by monitoring the received signal strength indicator (RSSI) of a signal from a base station and using the level crossing rate (LCR) and/or autocorrelation function (ACF) of such RSSI as an indicator of a mobile device's speed. However, such methods are generally most effective when the mobile device's speed is very large, for example, when sitting in a high speed train. It has been previously suggested to use RSSI as a mechanism to turn off cellular telephone capability in the Japanese high speed train system, where culturally, it is considered rude to speak on the telephone in such a public setting.

DRAWINGS

The embodiments of the present disclosure will now be described by reference to the following figures, in which identical reference numerals in different figures indicate identical elements and in which.

DESCRIPTION

Figure 1:
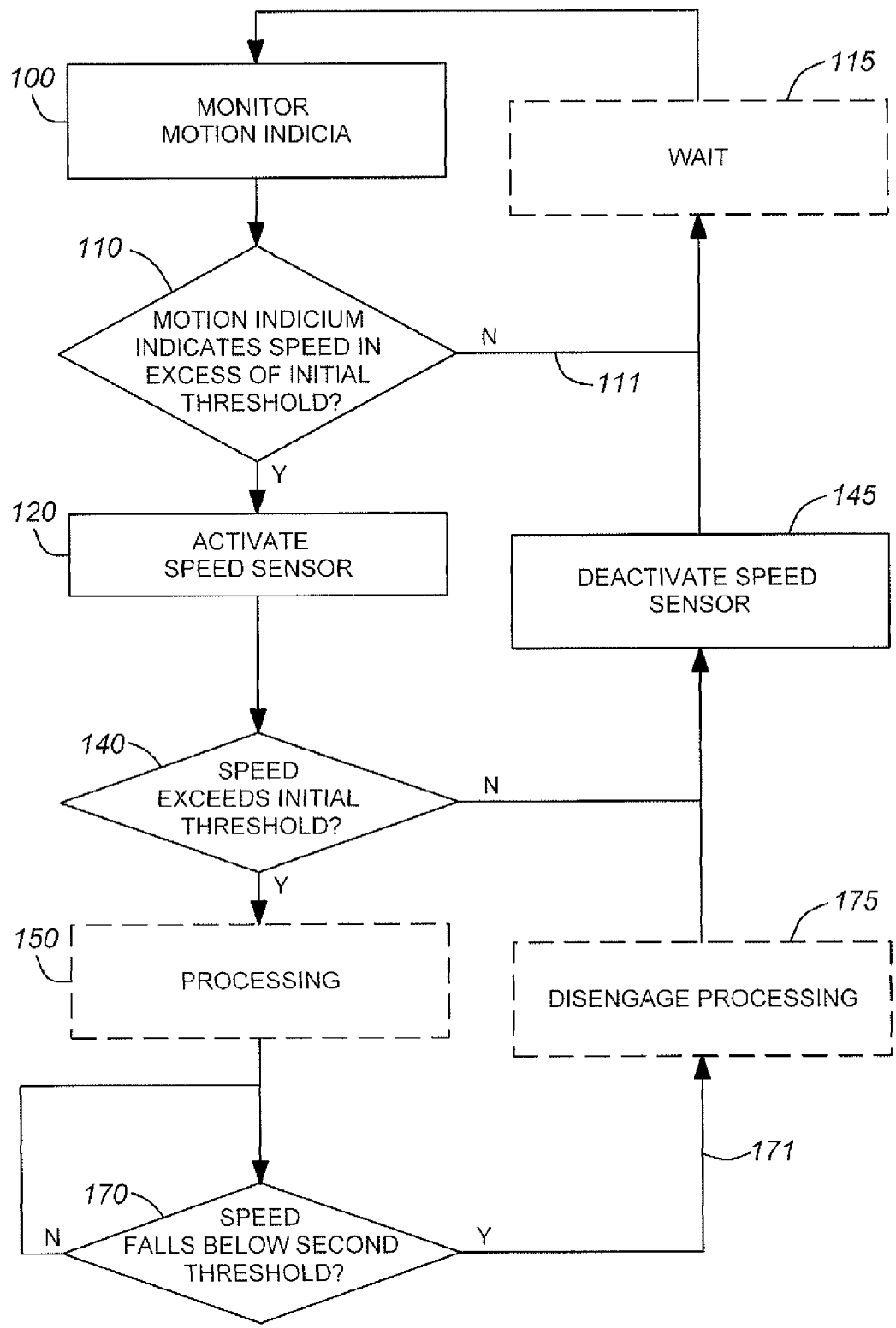
FIG. 1 is a flow chart showing example processing steps according to an example embodiment of the present disclosure.

A system and method is disclosed that permits speed measurement of a mobile device using a speed sensor such as a satellite navigation system or an accelerometer without such speed sensor having to be continually activated.

The system and method disclosed herein make use of a monitor of one or more motion indicia for identifying when the mobile device may be travelling in excess of the threshold, based on information already available to the mobile device, including but not limited to correlating the Doppler shift measurements of a timing signal; monitoring the timing advance of a cellular radio signal; monitoring the number of base stations visible to the mobile device; monitoring the frequency of base station handover, however determined; monitoring the level crossings and/or the autocorrelation of an RSSI signal; and/or triangulation of the position of the mobile device.

When such monitor identifies that the mobile device may be travelling in excess of a threshold speed, the speed sensor is activated to obtain (without false alarms) measurement of the speed of the mobile device. Preferably, when the speed sensor determines that the speed of the mobile device has slowed to a sufficient amount, the speed sensor is deactivated.

The present disclosure will now be described in detail for the purposes of illustration only, in conjunction with certain embodiments shown in the enclosed drawings.

The Global Positioning System (GPS)

The concept of the Global Positioning System was originally proposed as a worldwide means of navigation for the US military. It originally consisted of a series of 24 satellites in orbit at an altitude of about 20,200 kilometers above the earth's surface. As of September 2007, there are 31 actively broadcasting satellites in the GPS constellation. The additional satellites improve the navigation satellite receiver calculations by providing redundant measurements.

This high orbit, which lies well above the earth's atmosphere, yields an orbit that may be measured by a ground station. The orbit of each satellite is monitored twice daily by each of five monitoring stations.

The position of each satellite is known at any given time, including minor adjustments for gravitational effects of other planetary bodies, such as the sun and moon. Typically, this information is stored in an almanac within each navigation satellite, subject to periodic adjustments through message signals transmitted by each of the satellites.

Each satellite makes a complete orbit every 11 hours, 58 minutes, 2 seconds. The original constellation was spread out in six orbital planes. Thus, at any given point in time, from any point on earth, at least four or five satellites may lie above the horizon and thus remain in view. With the increased number of satellites, the constellation was changed to a non-uniform arrangement shown to improve reliability and availability of the system upon a multiple satellite failure, relative to the former uniform system.

Each satellite continuously transmits high-frequency radio signals comprising a coded message that contain timing information and data about the satellite's orbit. One of the frequency channels, denoted L1, is typically used by GPS applications for the general public. Other channels, denoted L2, L3, L4 and L5, are also defined and used by specific applications such as the U.S. military's special receivers. Some of them may also be used by certain civilian applications. These signals (such as on L1) are received by an antenna, amplified by an amplifier and forwarded to the GPS satellite receiver.

Each signal consists of a coded pseudo-random timing signal generated using a common reference clock signal and a message signal that identifies the transmitting satellite and from which its position may be determined, in conjunction with the almanac.

Each GPS satellite receiver makes use of the pseudo-random timing signal from typically at least four different satellites. The signals from each of these satellites are synchronized with each other.

The delay between the signals received by the navigation satellite receiver from the satellites and the signal generated by it when synchronized thereto may be used to derive the distance between the corresponding satellite and the navigation satellite receiver, by multiplying the delay by the speed of light.

Thus, with each received signal, the position of the navigation satellite receiver is constrained to lie on the surface of an imaginary sphere having a diameter equal to the distance between the navigation satellite receiver and the transmitting satellite and centered about the known position of the transmitting satellite.

The position of the navigation satellite receiver may thus be obtained by trilateration. With data from only three satellites, a geographic non-elevation two-dimensional fix may be obtained, while a three-dimensional fix including elevation may be obtained with data from a minimum of four satellites, from satellites widely distributed across the sky.

In addition to a positional fix, time of day and velocity information may be deduced from the signals transmitted by the satellites.

Optimal reception is obtained when the navigation satellite receiver is situated outdoors and with good visibility to most of the sky. Significantly degraded performance may be obtained when the navigation satellite receiver is situated indoors, in caves or in deep canyons where sky visibility may be severely restricted. Typically, clouds or bad weather do not degrade receiver performance.

Clearly, the performance and accuracy of the navigation satellite receiver is dependent upon synchronization of the coded timing signals transmitted by each satellite. Several atomic reference clocks are used in the satellite to generate and synchronize the reference clock signals used to encode the coded timing signals to a common reference clock frequency.

Typically, the navigation satellite receiver contains a fixed, free-running clock oscillator circuit, making use of a quartz crystal to determine its frequency.

Figure 3:
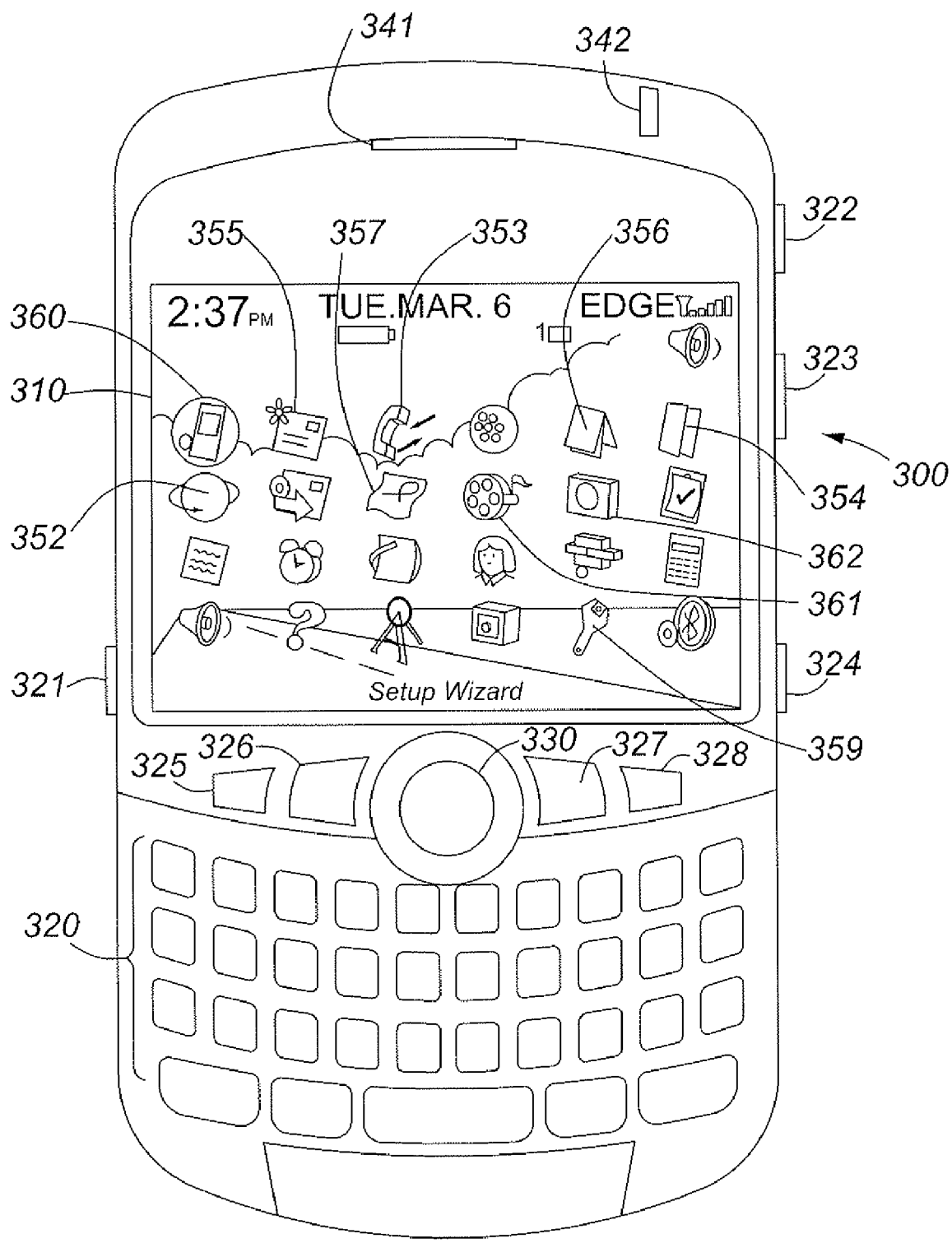
FIG. 3 is a graphical representation of a front view of an example of a mobile communications device for performing the processing steps of FIG. 1.

From the foregoing, a GPS or other navigation satellite receiver may comprise, if implemented or bundled within a mobile device such as device 300, shown in FIG. 3, a speed sensor.

For the purposes of the present disclosure, alternative speed sensors may be used in conjunction with or as a substitute for a GPS or other navigation satellite receiver. Such other speed sensors may include an accelerometer implemented or integrated within a mobile device 300, for various other purposes, for example, to detect movement of the device when used as a game controller and the like.

Processing Flow

Referring to FIG. 1, there is shown a flow chart of example processing steps that may be followed by a mobile device 300 in accordance with the present disclosure.

Upon initialization (not shown), a monitor 471 associated with the mobile device 300 may obtain 100 an indication of the speed of the mobile device 300 using one or more motion indicia as will be discussed in detail below.

The indication of the speed of the mobile device 300 is then compared 110 against an initial threshold that may be indicative of an upper bound for pedestrian traffic. The threshold may be, for example, on the order of 10 to 15 kilometers per hour or other suitable value. Depending upon the indicium used, obtaining the indication itself may inherently involve a comparison against the initial threshold.

If the indication is less than or equal to the initial threshold 111, then a further indication of the speed of the mobile device 300 may be obtained 100 by the monitor 471, either instantaneously or after a brief wait interval 115 (shown in dashed outline to indicate that it is optional).

Figure 4:
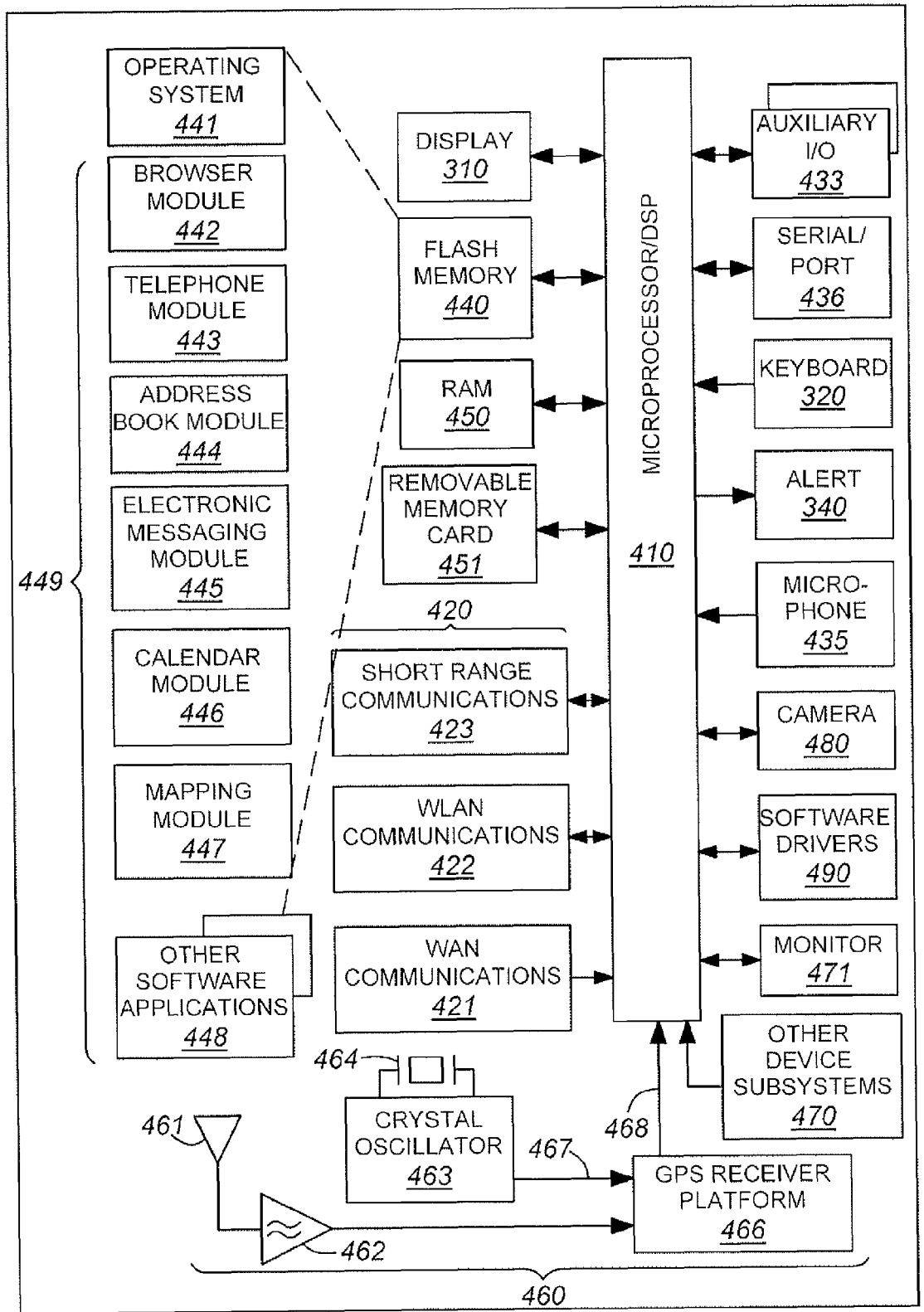
FIG. 4 is a simplified block diagram of the example device of FIG. 3.

It is only when the indication is greater than the initial threshold 112, that the speed sensor, for example, the GPS satellite receiver 460 shown in FIG. 4, is activated 120. In the discussion that follows, the GPS (or other navigation) satellite receiver 460 is considered to be the speed sensor, although other components may also be suitable. Preferably, the GPS satellite receiver 460 is not activated at step 120 if it is already powered up through another mechanism (not discussed herein).

Thereafter, the monitor 471 is disregarded for the time being and the speed of the mobile device 300 is accurately monitored, more or less continuously, by the GPS satellite receiver 460.

The speed of the mobile device 300 is thereafter compared, either constantly or periodically, against the initial threshold 140.

If the speed of the mobile device 300 as measured by the GPS satellite receiver 460 is less than or equal to the initial threshold 111, the GPS satellite receiver 460 is deactivated 145 so as to conserve battery power and a further indication of the speed of the mobile device 300 may be obtained 100 using the monitor 471, either instantaneously or after a brief wait interval 115. Preferably, the GPS satellite receiver 460 is not deactivated at step 145 if it has already been powered down through another mechanism (not discussed herein).

This scenario may arise in one of two ways. First, and the most likely scenario, is that the monitor 471 provided an indication of speed that inaccurately read higher than its actual speed. In this way, false positives are easily dealt with by the disclosed methodology, as they will be ignored. Second, it is possible that the indication of speed provided by the monitor 471 was accurate, but that in the time to energize the GPS satellite receiver 460, the speed of the mobile device 300 had dropped below the initial threshold.

In any event, it is only where the GPS satellite receiver 460 determines that the mobile device 300 is greater than the initial threshold that any processing relying or conditioned on the motion of the mobile device 300 is initiated. Such processing may include better characterizing the radio channel, including determining data rate selection and/or applying optimization techniques through an optimizer (not shown) and/or engaging a driver safety and/or other function controller such as, by way of non-limiting example, the driver safety feature disclosed in co-pending and commonly assigned U.S. patent application Ser. No. 12/043,495 described above, and may have additional controls disclosed therein or inferred therefrom that, for example, permit a user to selectively disengage the driver safety feature if the user is a passenger in a vehicle as opposed to being a driver.

Such processing may also or in the alternative comprise engaging other user features, for example, automatic enablement of a mapping module (shown as 447 in FIG. 4) to take advantage of the engagement of the GPS satellite receiver 460, or of an output device, for example, a display view on the mobile communications device 300 or audio indicator, for example, to show the current speed, heading and/or salient points of interest to a driver, or indeed to obtain a position fix for the mobile device 300.

There may be a myriad of alternative user and/or system features that may benefit from knowledge that the mobile device 300 is travelling in excess of a certain initial threshold speed (whether or not related to an upper bound of conventional pedestrian traffic).

Thereafter, the GPS satellite receiver 460 will continue to monitor the speed of the mobile device 300, whether continuously, as is likely to be the case where the speed sensor is the GPS satellite receiver 460, or periodically and compared against a second threshold value 170.

If the speed of the mobile device 300 should happen to fall below such second threshold value 171, the at-speed processing function controllers may be reversed or disengaged 175. Thereafter, the GPS satellite receiver 460 is powered down 145 so as to conserve battery power and a further indication of the speed of the mobile device 300 may be obtained 100 using the monitor 471, either instantaneously or after a brief wait interval 115.

On the other hand, if the speed of the mobile device 300 continues to meet or exceed such second threshold 172, then the GPS satellite receiver 460 may simply continue to monitor 160 the speed of the mobile device 300.

If the second threshold is the same as the initial threshold and the mobile device 300 is travelling at around the speed corresponding thereto, the at-speed processing and the GPS satellite receiver 460 may be relatively continuously engaged and disengaged. To protect against this eventuality, and to take into account the delay in energizing and powering down the GPS satellite receiver 460 and/or in engaging and disengaging, the second threshold may be preferably set lower than the initial threshold, so as to provide a measure of hysteresis and to minimize the likelihood of relatively frequently engagement and disengagement cycles (thrashing).

In this manner, the power-intensive use of the GPS satellite receiver 460 may be restricted only to situations where it is determined, by the more energy efficient monitor 471, that it is likely that the speed of the mobile device 300 exceeds the initial threshold. As indicated, it is conventionally understood that such occasions are only a small fraction of the time that the mobile device 300 is in operation.

Given the foregoing description of the processing flow, false positive readings can be relatively easily dispensed with, but that false negative readings will not be readily detected. As such, in setting out the parameters for a given motion indicium, in the monitor 471, it may be preferable to tune such indicia, a number of which will be discussed below, to tend to produce more false positive readings than false negative readings.

On the other hand, operational considerations may dictate that such false negative scenarios are acceptable at least to a certain frequency.

The Monitor

As indicated above, any number of motion indicia may be suitable for the purposes of the present disclosure. The monitor 471 is configured to monitor one or more of such indicia and to return an indication that the mobile device 300 may be travelling at a speed above the initial threshold based on the indicia it is monitoring. A few potential mechanisms are disclosed herein by way of non-limiting example only. These include: correlating the Doppler shift measurements of a timing signal; monitoring the timing advance of a cellular radio signal; monitoring the number of base stations visible to the mobile device 300, monitoring the frequency of base station handover, however determined; monitoring the level crossing and/or the autocorrelation of an RSSI signal; and/or triangulation of the position of the mobile device 300.

More than one of such motion indicia may be monitored concurrently by the monitor 471. Additionally, in certain scenarios, one or more of such motion indicia may be preferred in the assessment of speed.

a. Correlating the Doppler Shift Measurements of a Timing Signal

As discussed in co-pending and commonly assigned U.S. patent application Ser. No. 12/050,351, the mobile device 300 may be configured to perform a plurality of Doppler shift measurements on a timing signal received by it. In this embodiment, the mobile device 300 includes a processing component configured to correlate the size of the range of the Doppler shift measurements to the speed at which the mobile device 300 is moving. More specifically, the width or spread of a frequency error distribution of the Doppler shifts of a radio signal received by the mobile device 300 from a network element is used to indicate the speed of the mobile device 300.

This mechanism relies on the concept that the network element can transmit a timing signal that the mobile device 300 can use to compensate for Doppler effects and keep the mobile device 300 synchronized with the network. Mobile devices typically include a timing component, such as an Automatic Frequency Control (AFC) system, that can receive information contained in the timing signal and use it to compensate for Doppler effects that could cause a loss of synchronization between the mobile device 300 and the network. The timing component may include a voltage controlled temperature compensated crystal oscillator (VCTCXO) or a similar element that can produce a radio frequency (RE) output. The timing component is then able to compare the internally produced RF output to the timing signal to determine the amount of Doppler shift experienced by a moving mobile device 300.

However, factors such as multi-path interference, fading effects due to environmental change, and variability between base station line of sight and direction of travel of the mobile device 300 can cause difficulties in measuring the Doppler shift as experienced by the mobile device 300 at a given time. Moreover, the inherent limits of accuracy of the timing component, which may be due to noise in the timing component, short-term temperature drift, resolution limits of the processing components in the timing component and/or in the mobile device 300, and other factors, may cause inconsistency of results, resulting in a frequency error distribution of measurements.

Figure 2:
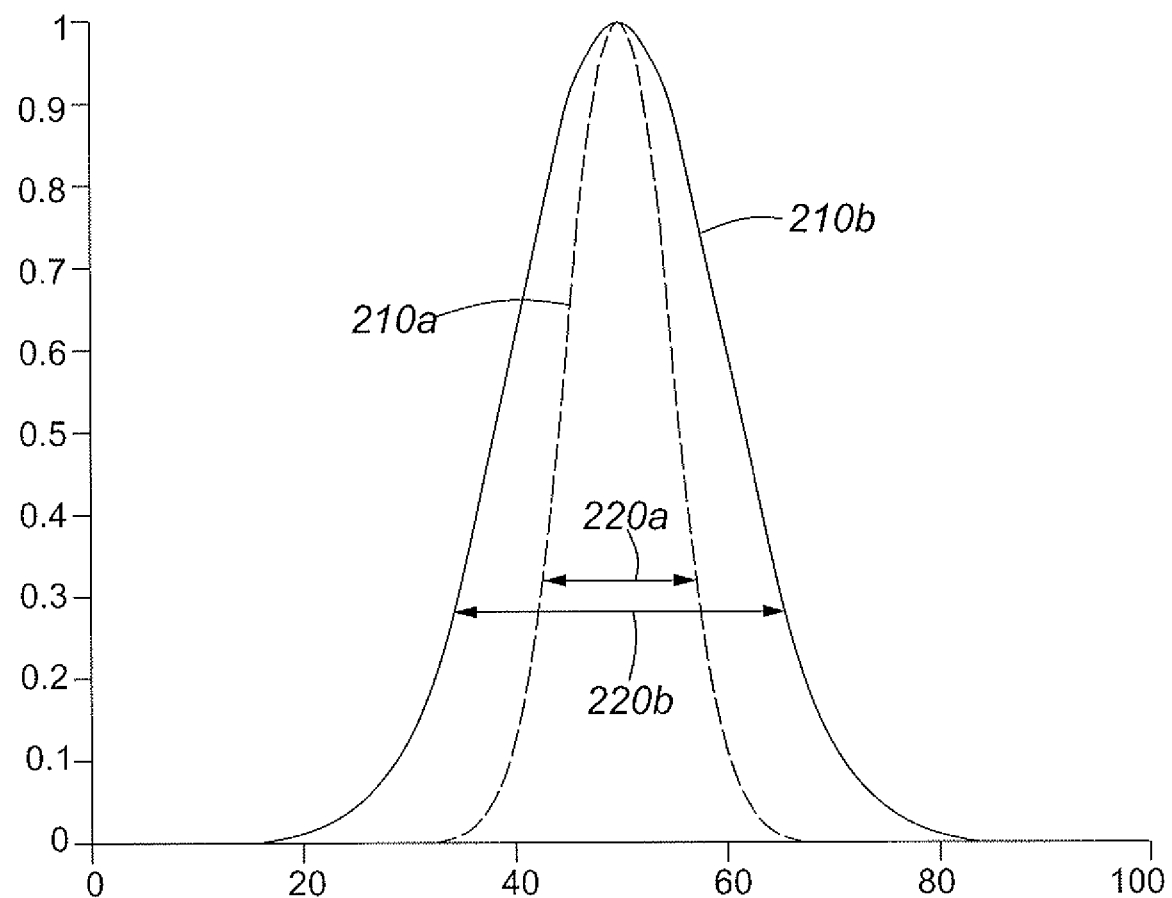
FIG. 2 is a diagram of a plurality of example ranges of frequency offsets according to an example embodiment of the present disclosure.

As illustrated in FIG. 2, two curves 210 depict an qualitative or idealized representation of frequency error distribution for Doppler shift measurements made by the mobile device 300 where the mobile device 300 is stationary or is being carried by a pedestrian 210a and where the mobile device 300 is in a vehicle moving at a higher speed 210b. It may be seen that the width 220 of the frequency error distribution may be used by the monitor 471 as an indication of the speed of the mobile device 300, for example, by identifying certain frequency error distribution widths 220 and associating them with particular ranges of speeds.

This indicium does not entail any significant additional power, inasmuch as the timing signal is provided by the network element to the mobile device 300 in any event for synchronization of communications between them.

b. Monitoring the Timing Advance of a Cellular Radio Signal

A second motion indicium relies upon the timing advance of a mobile device 300 that has communications with a network element.

In the Global System for Mobile Communications (GSM) cellular mobile telephone standard, timing advance corresponds to the length of time a signal from the mobile device 300 takes to reach its associated base station. This information is of use because GSM shares a single frequency between multiple users, assigning sequential timeslots (total of 8) to each user sharing a common frequency, with each user transmitting periodically for less than $\frac{1}{8}^{th}$ of the time within one of the eight timeslots. Because the users sharing a frequency may be various distances from the base station, the time at which the mobile device 300 should transmit its burst of traffic within a timeslot is adjusted using the timing advance. The timing advance value ranges from a value of between 0 and 63, each step representing an advance of one symbol period (approximately 3.69 μs.). Thus, with radio waves travelling at the speed of light ($3 \times 10^8$ m/s), a single timing advance step represents a change in round trip distance of about 1.1 km or about 550 m in distance between the mobile device 300 and the base station.

Similar concepts are in use in other communications standards, for example, code division multiple access (CDMA).

As a result, changes in the timing advance and related concepts may be used to provide the monitor 471 with an indication of movement and consequently of speed of the mobile device 300. Care should be taken to ensure that changes in timing advance are with respect to the same base station. However, even if handover has occurred, there will likely be sufficient information regarding the relative locations of the base stations that timing advance information may be a sufficient indicator of movement to actuate the accurate speed sensor.

Speed indication using timing advance is largely dependent upon the direction of motion relative to the base station. For example, if the motion is transverse to a line interconnecting the base station and the mobile device 300, a mobile device 300 travelling at a considerable speed may not reflect any change in the apparent speed resulting in a false negative reading. However, it is expected that movement in such a direction is unlikely to be consistent in most cases, with the result that after a small delay, the direction of travel of the mobile device 300 will change sufficiently that this motion indicium will register sufficient movement to energize the GPS satellite receiver 460, which can thereafter track movement of the mobile device 300 in any direction.

A related indicium may involve the use of an Internet Control Message Protocol (ICMP) request in which a ping is manually requested. The time for the mobile device 300 to transmit the ping signal to the base station and to get it returned is measured as an indication of range relative to the base station. Care should be taken to ensure, however, that the base station returns the ping signal within a known and determinate period upon receipt of the ping signal from the mobile device 300, which may not necessarily be the case in all situations. Even so, at best, an indeterminate delay may result in a number of false positive and/or false negative conditions, which may be acceptable, having regard to the propensity of the disclosed method and system to discard and take into account at least false positive indications.

As well, in most 3G or higher generation networks, it is contemplated to incorporate broadcast channels including digital video broadcast signals which may have timing information that may be monitored and processed by the base station in a similar manner to the timing advance information.

c. Monitoring the Number of Base Stations Visible to the Mobile Device

A third motion indicium may be the number of base stations visible to the mobile device 300. Typically, in cellular communications, the mobile device 300 keeps track of the number of base stations that are visible to it at any given time. This information is maintained so that if the signal from the currently associated base station degrades to the extent that handover to another base station is called for, the mobile device 300 knows which base stations are visible to it and will communicate this knowledge to the currently associated base station so that it can initiate handover.

Significant changes in the number and/or identity of base stations visible to the mobile device 300 within a given time period may serve as another de facto indicator that the mobile device 300 is travelling at a speed above the initial threshold sufficient to trigger the energizing of the GPS satellite receiver 460.

This indicium will not easily translate into a numerical estimate of speed, but rather, may comprise a constellation of conditions that, when satisfied, identifies a condition of sufficient speed to trigger energizing the GPS satellite receiver 460.

d. Monitoring the Frequency of Base Station Handover

This indicium is related to but separate from the previous indicium. Under the previous indicium, information gathered by the mobile device 300 in order to prepare for handover is included as part of the information monitored by the monitor 471 to obtain an indication of speed against the indicium. Actual handover need not take place.

In this fourth indicium, the number of occasions, as a function of time, that handovers actually take place may also act as a trigger to energize the GPS satellite receiver 460. This indicium is discussed to some extent in commonly assigned U.S. patent application Ser. No. 11/335,807 filed on Jan. 18, 2006 by Pecen and entitled "Method And Apparatus For Use In Switching Communication Operations Between A Wireless Wide Area Network And A Wireless Local Area Network", the text of which is incorporated by reference in its entirety herein, in which the visited cell site history information of the traversed environment may be used to provide an estimation of whether the mobile device 300 is moving "quickly" or "slowly" through the environment. Both the number of cells visited within a given time period and the number of times each such cell is selected may provide a rough assessment of whether the mobile device 300 is moving quickly throughout a geographic region. Such an indication is used to determine the maximum data rate that can be allowed in higher generation communication protocols, which are generally a function of the speed of the mobile device 300.

There may be alternative indicia which may suggest base station handover and which may be monitored by monitor 471 as an indicium of the speed of the mobile device 300.

For example, the IP address assigned to a mobile device 300 with wireless Internet capability is generally a temporary address assigned and identifiable as being associated with a particular base station. As a result, monitoring the rate at which the IP address assigned to the mobile device 300 varies may be suitable as a motion indicium.

As well, the frequency of handover from one cell sector serviced by a base station to another may potentially be indicative of the speed of the mobile device 300 as in related 3GPP standard TS 51.010-1 version 7.5.0 Release 7 576 ETSI TS 151 010-1 V7.5.0 (2007-03) ETSI. Care should be taken, however, in such cases, because some intra-base station or "soft" handovers are not as a result of mobile device 300 movement, but as a result of the capacity loading of a given frequency band.

e. Monitoring the Level Crossing and/or the Autocorrelation of an RSSI Signal

In B. Zhou, "Mobile Velocity Estimation in Multipath Fading Channels", M. Sc. Thesis, Queen's University at Kingston, Ontario, June, 1999 (http://citeseerx.ist.psu.edu/viewdoc/summary?doi=10.1.1.9.659), methods of estimating mobile velocity are disclosed using level crossing rate (LCR) and autocorrelation (ACF) functions on discrete-time fading signals corrupted by additive noise. It appears that both methods produce close estimates to actual velocity and can be used as motion indicia, although the ACF methodology may be superior in low SNR conditions.

f. Triangulation of the Position of the Mobile Device

A sixth motion indicium of the mobile device 300 may be derived from triangulation of the mobile device 300 relative to a plurality of base stations. An example method of so doing is disclosed in U.S. Pat. No. 6,950,664 issued Sep. 27, 2005 to Chen et al. and entitled "Geolocation Using Enhanced Timing Advance Techniques", in which the timing advance value for the mobile device 300 with respect to a plurality of neighboring base stations is identified and used to triangulate a position of the mobile device 300 relative to the known positions of such base stations. The methodolology is likely to be used to provide geolocation capability for purposes of compliance with the E-911 initiative.

It should be noted that using such a methodology as the motion indicium may be counter productive, however, given that in order to obtain the timing advance from the plurality of base stations involves monitoring each of the plurality of base stations and the concomitant increased current draw.

Alternative methods of geolocation by triangulation may also be suitable. For example, the RSSI from each of a plurality of base stations may be used, provided some mechanism is developed to take into account multipath effects.

The Mobile Device

Referring now to FIG. 3, there is shown a graphical representation of a front view of an example of a mobile device 300 to which example embodiments described herein can be applied. The mobile device 300 has two-way electronic messaging communications capabilities and possibly also voice communications capabilities. Depending on the functionality provided by the mobile device 300, in various embodiments the mobile device 300 may be a wireless handset, a data communications device, a multiple-mode communications device configured for both data and voice communication, a mobile telephone, a pager, a personal digital assistant (PDA), which may be enabled for wireless communications, a personal entertainment device, a telecommunications device installed within a vehicle, a portable, laptop, notebook and/or tablet computer with a wireless modem or wireless network card, or a portable, laptop, notebook and/or tablet computer or a phone device with a fixed connection to a network, among other things. Many suitable devices may combine some or all of these functions. The mobile device 300 may support specialized activities, such as gaming, inventory control, job control and/or task management functions and the like.

The mobile device 300 is, in at least one example embodiment, a handheld device having a casing or housing that is dimensioned to fit into a purse, pocket or belt-mounted device holster.

The mobile device 300 includes a display screen 310, an alphanumeric keyboard or keypad 320, optionally one or more non-keyboard inputs, such as buttons 321-328, which may be navigational, function, exit and/or escape keys, which may be inwardly depressed to provide further input function, or touch-sensitive areas (not shown) within the display screen 310, and/or a rotatable input device such as a trackball 330 or scrollwheel or trackwheel (not shown) and a speaker 341, visible indicator 342 or other alert 340 (shown on FIG. 4).

The keyboard or keypad 320 may comprise a touch-sensitive surface (not shown). In some example embodiments keys in the keyboard 320 may contain one or more letters aligned in a QWERTY layout. In some embodiments the keys in the keyboard 320 may not be actual physical keys but may be virtual keys displayed on a touch screen display (not shown). In some example embodiments, the keyboard 320 includes a QWERTZ layout, an AZERTY layout, a Dvorak layout, sequential type layouts or the like, or a traditional numeric keypad (not shown) with alphabetic letters associated with a telephone keypad. In some example embodiments, the keyboard 320 layout has reduced keys, such as a reduced QWERTY layout.

Referring now to FIG. 4, the mobile device 300 includes a controller that includes at least one microprocessor and/or digital signal processor (DSP) 410 for controlling the overall operation of the mobile device 300. The microprocessor/DSP 410 interacts with a communications subsystem shown generally at 420, and with further device subsystems such as display 310, which may include a touch-sensitive surface, keyboard or keypad 320, one or more auxiliary input/output (I/O) subsystems or devices 433 (e.g. trackball 330, non-keyboard inputs 321-328 or a scrollwheel or trackwheel (not shown) and their associated controllers), one or more alerts 340 (which may be audible 341, visible 342 and/or tactile (not shown)) and/or a headset port (not shown), a microphone 435, a serial port 436, which may be a universal serial bus (USB) port, a flash memory 440, random access memory (RAM) 450, a removable memory card 451, a charge-coupled device (CCD) camera 480, a global positioning system (GPS) (or other navigation) satellite receiver 460, and any other device subsystems generally designated as 470, including monitor 471 and potentially an accelerometer (not shown).

The microprocessor/DSP 410 operates under stored program control of the operating system software and/or firmware 441 and various software and/or firmware applications 449 used by the microprocessor/DSP 410, which are, in one example embodiment, stored in a persistent store such as flash memory 440 or similar storage element. The operating system 441, software disclosures shown generally at 449, or parts thereof, may be temporarily loaded into a volatile store such as RAM 450.

The microprocessor/DSP 410 executes operating system drivers that provide a platform from which the rest of the software 441 and 449 operates. The operating system drivers 490 provide drivers for the wireless device hardware with standardized interfaces that are accessible to application software. The operating system drivers 490 include application management services ("AMS") (not shown) that transfer control between applications running on the mobile device 300.

The microprocessor/DSP 410, in addition to its operating system 441 functions, in example embodiments, enables execution of software applications 449 for interacting with the various device subsystems of the mobile device 300, by presenting options for user-selection, controls for user-actuation, and/or cursors and/or other indicators for user-direction. The mobile device 300 may further accept user data entry, including numbers to dial or various parameter values for configuring the operation of the mobile device 300.

A predetermined set of software applications 449 may be executed in response to user commands to control basic device operations, including data and voice communication applications, such as a web browser module 442, a telephone module 443, an address book module 444, an electronic messaging module 445 (which may include e-mail, SMS messaging and/or PIN messaging) and a calendar module 446, for example, will normally be installed on the mobile device 300 during manufacture. Further software applications 448, such as a mapping module 447, a media player module (not shown), a camera module (not shown), one or more Java applications (not shown), may also be loaded onto the communications device 300 during manufacture, or through wired or wireless communications along the communications subsystem 420, the auxiliary I/O subsystem 433, serial port 436, information carrier media such as portable data storage media like the removable memory card 451, or any other suitable subsystem 470, and installed in the RAM 450 or a non-volatile store such as the flash memory 440 for execution by the microprocessor/DSP 410. These applications may configure the mobile device 300 to perform various customized functions in response to user interaction. Such flexibility in application installation increases the functionality of the mobile device 300 and may provide enhanced on-device functions, communication-related functions, or both. In some embodiments, some or part of the functionality of the functional modules can be implemented through firmware or hardware components instead of, or in combination with, computer software instructions executed by the microprocessor/DSP 410 (or other processors (not shown)).

Under instructions from various software applications 449 resident on the mobile device 300, the microprocessor/DSP 410 is configured to implement various functional components or modules, for interacting with the various device subsystems of the mobile device 300. Additionally, the microprocessor/DSP 410 may be configured and/or programmed over-the-air, for example from a wireless base station 510, a wireless access point 521 (shown on FIG. 5), or a peer mobile device 300. The software application 449 may comprise a compiled set of machine-readable instructions that configure the microprocessor/DSP 410 to provide the desired functionality, or the software applications 449 may be high-level software instructions to be processed by an interpreter or compiler to indirectly configure the microprocessor/DSP 410.

The web browser module 442 enables the display 310 to show a web page and permits access to a specified web address, for example via data transfer over one or more of the communications subsystem 420 components, for example, by wireless communications with a wireless access point 521 (shown on FIG. 5), a cell tower 511, a peer mobile device 300, or any other wireless communication network or system 550. The network 550 is coupled to a wired network 570, such as the Internet, through which the mobile device 300 may have access to information on various origin servers 580 for providing content for display on the display 310. Alternatively, the mobile device 300 may access the network 550 through a peer mobile device 300, acting as an intermediary, in a relay type or hop-type connection.

The telephone module 443 enables the mobile device 300 to transmit and receive voice and/or data over one or more of the communications subsystem 420 components.

The address book module 444 enables address book information, such as telephone numbers, email and/or instant text messaging addresses and/or PIN numbers to be stored and accessed on the mobile device 300.

The electronic messaging module 445 enables the mobile device 300 to send and receive electronic messages over one or more of the communications subsystems 420 components. Examples of electronic messaging include email, personal identification number (PIN) messaging and/or short message service (SMS) messaging.

The calendar module 446 enables appointment and/or task information to be stored and accessed on the mobile device 300.

The mapping module 447 provides location-based services relative to the current location of the mobile device 300, including but not limited to storage, access and/or retrieval of detailed mapping information on the communications device 300 and provision of turn-by-turn directions from an initial map position to a desired destination map position in accordance therewith. Other location-based service modules (not shown) may include the E911 cellular phone positioning initiative of the Federal Communications Commission (FCC).

The media player application 448 configures the mobile device 300 to retrieve and play audio or audiovisual media. The camera application 448 configures the mobile device 300 to image and take still or motion video images. The Java applets 448 configure the mobile device 300 to provide games, utilities, and other functionality. One or more components might provide functionality related to speed measurement, disablement of device features, and/or overriding of the disablement of device features as described herein.

Referring briefly to FIG. 3 again, there is shown an example of a mobile device 300 on which a plurality of user selectable icons are shown on its display screen 310. The icons are each associated with functions that can be performed by the mobile device 300. For example, FIG. 3 shows a browser icon 352 for accessing web browsing functions (associated with browser module 442), a "Phone" icon 353 for accessing phone functionality (associated with telephone module 443), an "Address Book" icon 354 for accessing address book functions (associated with address book module 442), a "Messages" icon 355 for accessing electronic messaging functions of the communications device 300 (associated with electronic messaging module 445), a "Calendar" icon 356 for accessing calendar functions (associated with calendar module 446), a "Maps" icon 357 for accessing mapping functions (associated with mapping module 447), a "Media" icon 361 for accessing media player functions (associate with media player application 448), a "Camera" icon 362 for accessing camera functions (associated with the camera application 448) and an options icon 359 (associated with an options module, which may be a separate module or executed by one or more existing modules). An icon 350 is shown highlighted or focused by a caret or selection symbol 360 which can be navigated by a device user among the displayed icons through manipulation of the trackball 330 (or other navigational input device). The trackball 330 is also depressible, such that depression of the trackball 330 when an icon is highlighted or focused by selection symbol 360 results in the launch of functions of the associated module.

Each of the software disclosures 449 may include layout information defining the placement of particular fields, such as text fields, input fields, etc., in a user interface for the software disclosure 449.

Figure 5:
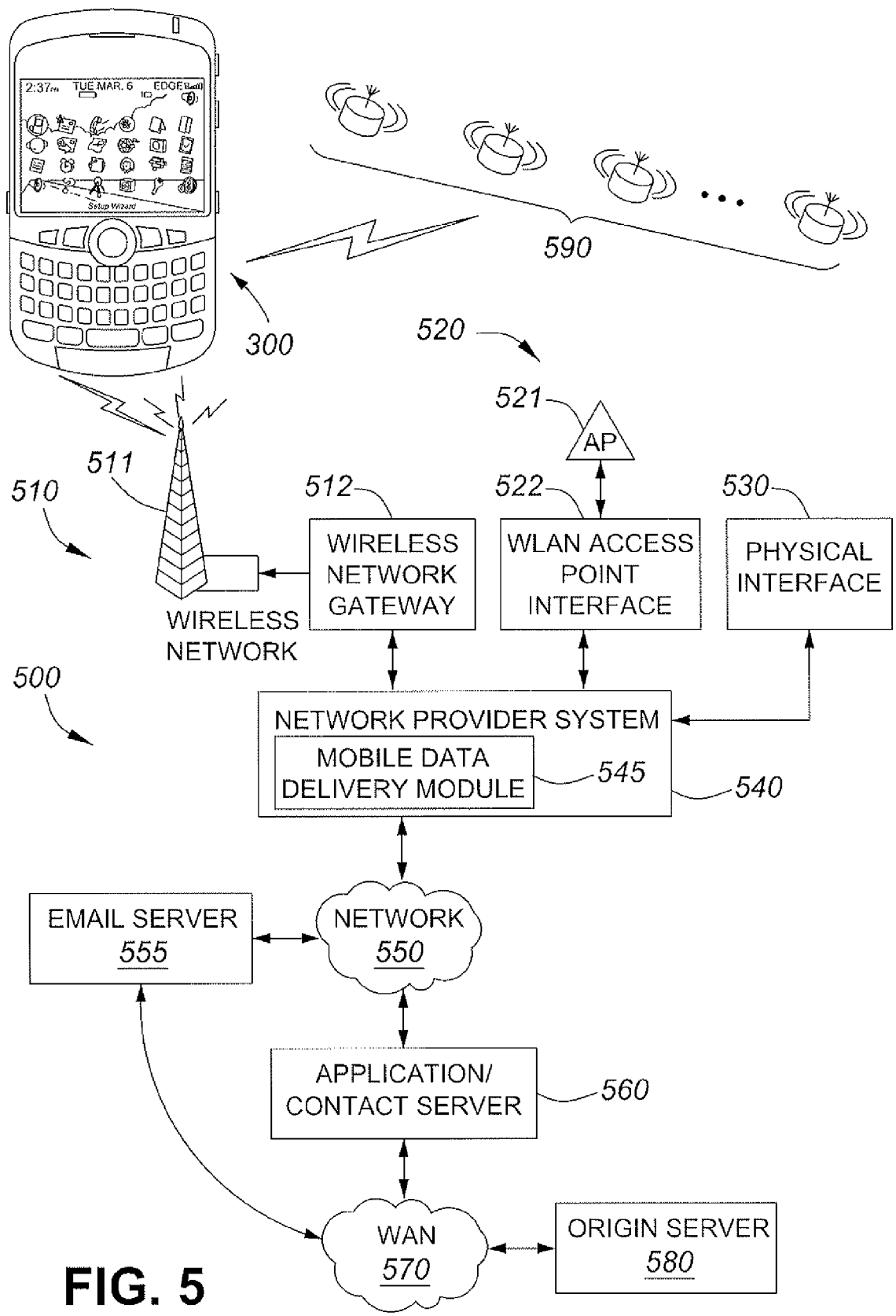
FIG. 5 is a simplified block diagram of a communications environment suitable for the example device of FIG. 3.

In FIG. 4, the communications subsystem 420 acts as an interface between the mobile device 300 and a communications environment 500 shown in FIG. 5. The particular configuration of the communications subsystem 420 will be dependent upon the communications network(s) in the communications environment 500 in which the communications device 300 is intended to operate.

In FIG. 5, the communications environment 500 is shown to include one or more mobile devices 300 (only one of which is shown in FIG. 5), a wireless Wide Area Network (WAN) 510 and associated base station 511, a Wireless Local Area Network (WLAN) 520, and/or other interfaces. In some example embodiments, the mobile device 300 is configured to communicate in both data and voice modes over both wireless WAN 510 and WLAN 520 networks and to roam between such networks.

Thus, in the example embodiment shown in FIG. 4, the communications subsystem 420 includes a WAN communications module 421, a WLAN communications module 422 and a short range communications module 423.

The wireless WAN communications module 421 is for two-way communications with the wireless WAN 510 and the WLAN communications module 422 is for two-way communications with the WLAN 520 along an access point 521 associated therewith. According to one embodiment, the WAN 521 and WLAN 522 communications modules include respective antennas and associated front end units (not shown), RF transceivers (not shown), and some baseband and signal processing capabilities, implemented, for example, by microprocessor/DSP 410 or a different DSP (not shown).

The antenna and front end unit may be provided to convert between wireless signals and electrical signals, enabling the mobile device 300 to send and receive information from WAN network 510, which may be a cellular network or some other available wireless communications network or from a peer mobile device 300. In an embodiment, the antenna and front end unit may include multiple antennas to support beam forming and/or multiple input multiple output (MIMO) operations. MIMO operations may provide spatial diversity which can be used to overcome difficult channel conditions and/or increase channel throughput. The antenna and front end unit may include antenna tuning and/or impedance matching components, RF power amplifiers, and/or low noise amplifiers.

The RF transceiver provides frequency shifting, converting received RF signals to baseband and/or intermediate frequency (IF) and converting baseband and/or IF frequency transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit and/or the microprocessor/DSP 410 or other central processing unit.

The analog baseband processing unit may provide various analog processing of inputs and outputs, for example analog processing of inputs from the microphone 435 and outputs to the speaker 341 and/or other alerts 340. To that end, the analog baseband processing unit may have ports for connecting to the built-in microphone 435 and the alert(s) 340 that enable the mobile device 300 to be used as a cell phone. The analog baseband processing unit may further include a port for connecting to a headset or other hands-free microphone and speaker configuration. The analog baseband processing unit may provide digital-to-analog conversion in one signal direction and analog-to-digital conversion in an opposing signal direction. In some embodiments, at least some of the functionality of the analog baseband processing unit may be provided by digital processing components, for example by the microprocessor/DSP 410 or by other central processing units.

In some embodiments, the RF transceiver, portions of the antenna and front end, and the analog baseband processing unit may be combined in one or more processing units and/or application specific integrated circuits (ASICs).

The microprocessor/DSP 410 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the microprocessor/DSP 410 may perform modulation, coding, interleaving, and spreading, and for a receiver function the microprocessor/DSP 410 may perform despreading, deinterleaving, decoding, and demodulation. In another embodiment, for example in an orthogonal frequency division multiplex access (OFDMA) technology application, for the transmitter function the microprocessor/DSP 410 may perform modulation, coding, interleaving, inverse fast Fourier transforming, and cyclic prefix appending, and for a receiver function the microprocessor/DSP 410 may perform cyclic prefix removal, fast Fourier transforming, deinterleaving, decoding, and demodulation. In other wireless technology applications, yet other signal processing functions and combinations of signal processing functions may be performed by the microprocessor/DSP 410.

The microprocessor/DSP 410 may communicate with a wireless network via the analog baseband processing unit. In some embodiments, the communication may provide Internet connectivity, enabling a user to gain access to content on the Internet and to send and receive e-mail or text messages. The flash memory 440, RAM 450 and the removable memory card 451 may provide software and data to configure the operation of the microprocessor/DSP 410. Among the interfaces may be the serial port 436 and the short range wireless communication sub-system 423. The serial port 436 may be used to charge the mobile device 300 and may also enable the mobile device 300 to function as a peripheral device to exchange information with a personal computer or other computer system. The short range wireless communication sub-system 423 may include an infrared port, a Bluetooth interface, an IEEE 802.11 compliant wireless interface, or any other short range wireless communication sub-system, which may enable the mobile device 300 to communicate wirelessly with other nearby mobile devices and/or wireless base stations (not shown).

In a data communications mode, a received signal such as a text message or web page download will be processed by the communications subsystem 420 and output to the microprocessor/DSP 410, which further processes the received signal for output to the display 310, or alternatively to an auxiliary I/O device 433.

The keyboard 320 and other various input devices, including, an auxiliary I/O device 433 (such as the buttons 321-328, the trackball 330, a display 310 with touch screen capability (not shown), the scroll wheel and/or track wheel) and/or the microphone 435 on the mobile device 300 may also be used to compose data items within the software applications 449, such as email messages or voice communications, in conjunction with the display 310, possibly an auxiliary I/O device 433 and/or the alerts 340. Such composed items and/or voice communications may then be transmitted and received over a communications network in the communications environment 500 through the communications subsystem 420.

The alert 340, when triggered, causes the mobile device 300 to provide a notice to the user, for example, by ringing, playing a melody, or vibrating. The alert 340 may serve as a mechanism for alerting the user to any of various events such as an incoming call, a new text message, and an appointment reminder by silently vibrating, or by playing a specific pre-assigned melody for a particular caller.

The serial port 436 comprises a USB-type interface port for interfacing or synchronizing with another device, such as a desktop computer (not shown). The serial port 436 is used to set preferences through an external device or software application. The serial port 436 may also be used to extend the capabilities of the mobile device 300 by providing for information or software downloads, including user interface information, to the mobile device 300.

The flash memory 440 or other persistent storage of the mobile device 300 may house, in addition to software and/or firmware stored program instructions, certain information including address book information such as telephone numbers, email and/or instant text messaging addresses and PIN numbers. Such information may also be at least partially stored at least some of the time in memory of a Subscriber Identity Module (SIM) card (not shown) used with the mobile device 300, in volatile device memory (such as the RAM 450), and/or at a location accessible to the mobile device 300 over WAN 510.

Additionally, the flash memory 440 may be used to store data structures, preferences and/or parameters.

The RAM 450, which may constitute non-volatile or volatile memory, with or without battery backup, may be used as a supplement to, or in place of, flash memory 440, and to maintain data and/or program instructions for use by the microprocessor 410 in executing one or more of the functions of operating system 441 and/or the software applications 449, including but not limited to the mapping module 447.

The CCD camera 480, if equipped, enables the mobile device 300 to take digital pictures and/or video. The microprocessor/DSP 410 communicates with the CCD camera 480 via a camera controller (not shown). In another embodiment, a camera operating according to a technology other than Charge Coupled Device cameras may be employed.

The navigation satellite receiver 460 may comprise an antenna 461, an amplifier 462, a crystal oscillator 463, a crystal 464 and a GPS or navigation platform or module 466. While the American Global Positioning System (GPS) is referenced in some instances throughout, methods and apparatus described in this disclosure may equally be used in conjunction with other types of global or regional navigation satellite systems, including but not limited to the European Galileo, Russian GLONASS and Chinese Beidou Compass systems.

The navigation platform 466 is a conventional GPS or A-GPS receiver platform, such as the GSC3 LTi GPS chip manufactured by SiRF Technology, Inc. Preferably, the navigation platform 466 has a bi-directional communications link 468 with the microprocessor 410 to permit the exchange of data and control messages in compliance with the Assisted GPS (A-GPS) enhanced performance system. A-GPS permits the navigation satellite receiver 460 to make use of an assistance server (not shown) to reduce the time required by the receiver to lock-on to an initial positional fix, or Time To First Fix (TIFF), which may be considerable in poor signal conditions, such as in a high multipath environment occasioned by tall buildings, being indoors or under trees.

One example of A-GPS may be related to the advent of the FCC's E911 mandate requesting the position of a cell phone to be available to emergency call dispatchers. Under an A-GPS system, a GPS subsystem embedded in or coupled to a cellular phone may benefit from aiding information provided to it by the wireless network. Such information may range from an approximate location based on identification of with which cell site the phone is connected, the time of day, and/or provision of GPS satellite navigation data, which may be used in the GPS receivers to derive orbital data on the position of the GPS satellites 590, or used to enhance processing gain for improved sensitivity. Additionally, an assistance server may provide information on ionospheric conditions and other errors affecting the GPS signal.

The Communications Environment

Turning now to FIG. 5, the WAN 510 may be implemented as a packet-based cellular network that includes a number of base stations 511 (only one of which is shown), where each of the base stations 511 provides wireless Radio Frequency (RF) coverage to a corresponding area or cell. The wireless WAN 510 is typically operated by a cellular network service provider that sells subscription packages to users of mobile electronic devices. The WAN 510 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), IDEN (Integrated Digital Enhanced Network) or various other third generation networks such as EDGE (Enhanced Data rates for GSM Evolution) or UMTS (Universal Mobile Telecommunications Systems).

The communications environment 500 also includes a wireless network gateway 512 and one or more network provider systems 540. The wireless network gateway 512 provides translation and routing services between the network provider system(s) 540 and the WAN 510, which facilitates communication between the mobile electronic devices 300 and other devices (not shown) connected, directly or indirectly, to the network provider system 540. The WAN 510 may also include location-based service services (not shown) to provide applications and/or GPS assistance.

The WLAN 520 comprises a network which, in some example embodiments, conforms to IEEE 802.11 standards such as 802.11b and/or 802.11g; however, other communications protocols may also be used for the WLAN 520. The WLAN 520 includes one or more wireless RE Access Points (AP) 521 (one of which is shown), that collectively provide a WLAN coverage area. The WLAN 520 may be operated by an enterprise (for example, a business or university) and the access points 521 are connected to an access point (AP) interface 522. The AP interface 522 provides translation and routing services between the access points 521 and the network provider system 540 to facilitate communication between the mobile electronic devices 300 and other devices (not shown) connected directly or indirectly, to the network provider system 540. The AP interface 522 is implemented using a computer, for example, a server running a suitable computer program or software.

According to one embodiment, other interfaces may be implemented using a physical interface 530. The physical interface 530 may include an Ethernet, Universal Serial Bus (USB), Firewire and/or infrared (IR) connection implemented to exchange information between the network provider system 540 and the communications device 300 when physically connected therewith.

The network provider system 540 comprises a server which is located behind a firewall (not shown). The network provider system 540 provides access for the communications device 300, through either the WAN 510, the WLAN 520, or one of the physical interfaces 530 to the devices connected, for example, through an enterprise network 550 (e.g. an intranet), to the network provider system 540, such as a network 550, an email server 555, one or more disclosure/content servers 560, a second WAN 570 and/or an origin server 580.

According to one embodiment, a mobile data delivery module 545 provides HTTP connectivity between the wireless WAN 510 and the WLAN 520 and the other physical connections 530 and devices and/or networks connected directly or indirectly to the network provider system 540. In one embodiment, the mobile data delivery module 545 is implemented on a computer, such as one housing the network provider system 540. The network 550, the email server 555, the disclosure/content server 560, the second WAN 570 and the origin server 580 are individually and/or collectively in various combinations, a content source for the network provider system 540. The system shown in FIG. 5 comprises one possible communications network or configuration for use with the mobile communication device 300.

The network 550 may comprise a local area network, an intranet, the Internet, a direct connection, or combinations thereof. According to one embodiment, the network 550 comprises an intranet for a corporation or other type of organization.

In one example configuration, the email server 555 is connected to the network 550. This server 555 is configured to direct or redirect email messages received over the second WAN 570 and internally within the enterprise network 550 to be addressed to the mobile electronic device 300.

The disclosure/content server 560 may be connected to the network 550 and also to another network, for example, the second WAN 570.

The second WAN 570 may further connect to other networks. In one embodiment, the second WAN 570 comprises or is configured with the Internet, a direct connection, a LAN, a wireless communication link, or any combination thereof.

Content providers, such as the origin server 580, or Web servers, may be connected to the second WAN 570.

The communications environment 500 may also include a network of Global Positioning System (GPS) or other system of navigation satellites 590.

In the foregoing disclosure, for purposes of explanation and not limitation, specific details are set forth such as particular architectures, interfaces, techniques, etc. in order to provide a thorough understanding of the present disclosure. However, the present disclosure may be practised in other embodiments that depart from these specific details.

In some instances, detailed descriptions of well-known devices, circuits, and methods are omitted so as not to obscure the description of the present disclosure with unnecessary detail. All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, block diagrams reproduced herein can represent conceptual views of illustrative components embodying the principles of the technology.

Similarly, it will be appreciated that any flow charts, state transition diagrams, pseudocode, and the like represent various processes, which may be substantially represented in computer-readable medium and so executed by a computer or processor, whether or not such computer or processor is explicitly shown.

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and methods actions can be performed by a programmable processor executing a program of instructions to perform functions of the disclosure by operating on input data and generating output.

The functions of the various elements including functional blocks labelled as "processors" or "controllers" may be provided through the use of dedicated hardware, as well as hardware capable of executing software in association with appropriate software with sufficient processing power, memory resources, and network throughput capability to handle the necessary workload placed upon it.

When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read-only memory (ROM) for storing software, random access memory (RAM) and non-volatile storage.

The disclosure can be implemented advantageously on a programmable system including at least one input device, and at least one output device. Each computer program can be implemented in a high-level procedural or object-oriented programming language, or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs (digital signal processors).

Examples of such types of computer are programmable processing systems contained in the microprocessor/DSP 410 and other DSPs (not shown) suitable for implementing or performing the apparatus or methods of the disclosure. The system may comprise a processor, (which may be referred to as a central processor unit or CPU), which may be implemented as one or more CPU chips, and that is in communication with memory devices including secondary storage, read only memory (ROM), a random access memory, a hard drive controller, and/or an input/output devices and/or controllers, and network connectivity devices, coupled by a processor bus.

The secondary storage is typically comprised of one or more disk drives or tape drives and is used for non-volatile storage of data and as an over-flow data storage device if RAM is not large enough to hold all working data. Secondary storage may be used to store programs which are loaded into RAM when such programs are selected for execution. The ROM is used to store instructions and perhaps data which are read during program execution. ROM is a non-volatile memory device which typically has a small memory capacity relative to the larger memory capacity of secondary storage. The RAM is used to store volatile data and perhaps to store instructions. Access to both ROM and RAM is typically faster than to secondary storage.

I/O devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other network devices. These network connectivity devices may enable the processor to communicate with an Internet or one or more intranets. With such a network connection, it is contemplated that the processor might receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The network connectivity devices may also include one or more transmitter and receivers for wirelessly or otherwise transmitting and receiving signal as are well know to one of ordinary skill in the art.

Such information, which may include data or instructions to be executed using the processor for example, may be received from and outputted to the network, for example, in the form of a computer data baseband signal or signal embodied in a carrier wave. The baseband signal or signal embodied in the carrier wave generated by the network connectivity devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods.

The processor executes instructions, codes, computer programs, scripts which it accesses from hard disk, floppy disk, optical disk (these various disk based systems may all be considered secondary storage), ROM, RAM, or the network connectivity devices. While only one processor is shown, multiple processors may be present. Thus, while instructions may be discussed as executed by a processor, the instructions may be executed simultaneously, serially, or otherwise executed by one or multiple processors.

Various modifications and variations may be made to the embodiments disclosed herein, consistent with the present disclosure, without departing from the spirit and scope of the present disclosure.

While preferred embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are ascertainable by one skilled in the art and could be made without departing from the spirit and scope disclosed herein.

Further, the foregoing description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

Also, the terms "couple" and/or "communicate" in any form is intended to mean either an direct or indirect connection through some interface, device, intermediate component or connection, whether electrically, mechanically, chemically, or otherwise.

Moreover, all dimensions described herein are intended solely to be exemplary for purposes of illustrating certain embodiments and are not intended to limit the scope of the disclosure to any embodiments that may depart from such dimensions as may be specified.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric centre of a device, area and/or volume and/or designated parts thereof.

References in the singular form include the plural and vice versa, unless otherwise noted.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

Certain terms are used throughout to refer to particular components. Manufacturers may refer to a component by different names. It is not intended to distinguish between components that differ in name but not in function.

The purpose of the Abstract is to enable the relevant patent office and/or the public generally, and especially persons having ordinary skill in the art who are not familiar with patent or legal terms or phraseology, to quickly determine from a cursory inspection the nature of the technical disclosure. The Abstract is neither intended to define the invention of this disclosure, which is measured by its claims, nor is it intended to be limiting as to the scope of this disclosure in any way.

According to a first broad aspect of an embodiment of the present disclosure there is disclosed a mobile device comprising: a monitor for identifying when the mobile device may be travelling at a speed in excess of the initial threshold and for thereafter activating the speed sensor; and a selectively activated speed sensor for determining, when activated, a speed at which the mobile device is travelling and for determining if the mobile device is travelling at a speed in excess of an initial threshold.

According to a second broad aspect of an embodiment of the present disclosure there is disclosed a method for determining a speed of a mobile device, the method comprising the acts of: a. identifying a situation when the mobile device may be travelling at a speed in excess of an initial threshold; and b. upon identifying such a situation, activating a speed sensor to determine the speed of the mobile device.

According to a third broad aspect of an embodiment of the present disclosure there is disclosed a selectively activated speed sensor associated with a mobile device for determining, when activated, a speed at which the mobile device is travelling; the speed sensor being activated when a monitor identifies that the mobile device may be travelling at a speed in excess of the initial threshold.

According to a fourth broad aspect of an embodiment of the present disclosure there is disclosed a monitor associated with a mobile device for identifying that the mobile device may be travelling at a speed in excess of an initial threshold and for activating a speed sensor for determining a speed at which the mobile device is travelling.

According to a fifth broad aspect of an embodiment of the present disclosure there is disclosed a computer-readable medium in a selectively activated speed sensor associated with a mobile device, the medium having stored thereon, computer-readable and computer-executable instructions which, when executed by a processor, cause the processor to perform steps comprising: determining, when activated, a speed at which the mobile device is travelling; the speed sensor being activated when a monitor identifies that the mobile device may be travelling at a speed in excess of the initial threshold.

According to an sixth broad aspect of an embodiment of the present disclosure there is disclosed a computer-readable medium in a monitor associated with a mobile device, the medium having stored thereon, computer-readable and computer-executable instructions which, when executed by a processor, cause the processor to perform steps comprising: identifying that the mobile device may be travelling at a speed in excess of an initial threshold and thereafter activating a speed sensor for determining a speed at which the mobile device is travelling.

Other embodiments consistent with the present application will become apparent from consideration of the specification and the practice of the disclosure disclosed herein.

What is claimed is:

1. A mobile device comprising:
   a selectively activated speed sensor for determining, when activated, a speed at which the mobile device is travelling and for determining if the mobile device is travelling at a speed in excess of an initial threshold; and
   a monitor for identifying when the mobile device may be travelling at a speed in excess of the initial threshold using a motion indicium other than speed determined by the speed sensor and in response, activating the speed sensor to determine the speed at which the mobile device is travelling.

2. The mobile device according to claim 1, wherein the monitor monitors at least one motion indicium.

3. The mobile device according to claim 1, wherein the motion indicium is chosen from a group consisting of: Doppler shift measurements of a timing signal; timing advance; visible base stations; base station handover; received signal strength indicator (RSSI); triangulator of the location of the mobile device from a plurality of visible base stations; and any combination thereof.

4. The mobile device according to claim 1, the speed sensor for deactivating itself when the mobile device is travelling at a speed less than a minimum threshold.

5. The mobile device according to claim 4, wherein the minimum threshold is less than the initial threshold.

6. The mobile device according to claim 1, further comprising an optimizer for characterizing a radio channel used by the mobile device that is selectively activated when the speed sensor determines that the mobile device is travelling at a speed in excess of the initial threshold.

7. The mobile device according to claim 1, further comprising a selectively activated function controller that is activated when the speed sensor determines that the mobile device is travelling at a speed in excess of the initial threshold.

8. The mobile device according to claim 7, wherein the function controller is a driver safety module for deactivating the at least one function of the mobile device.

9. The mobile device according to claim 8, wherein the at least one function is selected from a group consisting of a capability to provide information on an output interface of the mobile device and a capability to input into an input interface of the mobile device.

10. The mobile device according to claim 8, wherein the at least one function is a mapping function that is activated when the speed of the mobile device exceeds the initial threshold.

11. The mobile device according to claim 1, wherein the speed sensor is selected from a group consisting of: a satellite navigation system and an accelerometer.

12. A machine-implemented method for determining a speed of a mobile device, the method comprising the acts of:

a. identifying a situation when the mobile device may be travelling at a speed in excess of an initial threshold based on input from a monitor for identifying when the mobile device may be travelling at a speed in excess of the initial threshold using a motion indicium other than speed determined by a speed sensor; and b. responsive to identifying such a situation, activating the speed sensor to determine the speed of the mobile device.

13. The method according to claim 12, further comprising:
c. if the speed of the mobile device is less than a second threshold, deactivating the speed sensor.

14. The method according to claim 12, further comprising:
d. if the speed of the mobile device exceeds the initial threshold, characterizing a radio channel used by the mobile device.

15. The method according to claim 14, further comprising:
e. if the speed of the mobile device is less than a second threshold, stopping the characterization.

16. The method according to claim 12, further comprising:
f. if the speed of the mobile device exceeds the initial threshold, enabling or disabling at least one function of the mobile device.

17. The method according to claim 16, further comprising:
g. if the speed of the mobile device is less than the second threshold, reversing the enabling or disabling of the at least one function of the mobile device.

18. The method according to claim 16, wherein the at least one function is selected from a group consisting of providing information to an output interface of the mobile device and accepting information input into an input interface of the mobile device.

19. The method according to claim 12, wherein the act of identifying comprises monitoring a Doppler shift measurement of a timing signal associated with the mobile device.

20. The method according to claim 12, wherein the act of identifying comprises monitoring a timing advance of a cellular radio signal associated with the mobile device.

21. The method according to claim 12, wherein the act of identifying comprises monitoring a number of base stations visible to the mobile device.

22. The method according to claim 12, wherein the act of identifying comprises monitoring a frequency of base station handovers of the mobile device.

23. The method according to claim 22, wherein the act of monitoring a frequency of base station handovers comprises monitoring a value selected from a group consisting of a number of cells visited in a given time and a number of times a cell is selected, in a visited cell site history of the mobile device.

24. The method according to claim 22, wherein the act of monitoring a frequency of base station handovers comprises monitoring a rate at which an IP address assigned to the mobile device changes.

25. The method according to claim 24, wherein the act of monitoring a frequency of base station handovers comprises monitoring a frequency of handover of the mobile station from a first cell sector serviced by a base station to a second cell sector serviced by the base station.

26. The method according to claim 12, wherein the act of identifying comprises monitoring a received signal strength indicator (RSSI) of a signal associated with the mobile device.

27. The method according to claim 26, wherein the act of monitoring an RSSI comprises monitoring a value selected from a group consisting of a level crossing rate (LCR) and an autocorrelation function (ACF), associated with the RSSI.

28. The method according to claim 12, wherein the act of identifying comprises monitoring the position of the mobile device relative to a plurality of base stations using a parameter associated with each of the plurality of base stations.

29. The method according to claim 28, wherein the parameter is a timing advance parameter.

30. A selectively activated speed sensor associated with a mobile device for determining, when activated, a speed at which the mobile device is travelling;
the speed sensor being activated to determine the speed at which the mobile device is travelling in response to a monitor identifying that the mobile device may be travelling at a speed in excess of the initial threshold using a motion indicium other than speed determined by the speed sensor.

31. The speed sensor of claim 30, for deactivating itself when it determines that the mobile device is travelling at a speed less than a second threshold.

32. A monitor associated with a mobile device for identifying that the mobile device may be travelling at a speed in excess of an initial threshold using a motion indicium other than speed determined by a speed sensor and in response activating the speed sensor to determine a speed at which the mobile device is travelling.

33. A non-transitory computer-readable medium in a selectively activated speed sensor associated with a mobile device, the medium having stored thereon, computer-readable and computer-executable instructions which, when executed by a processor, cause the processor to perform steps comprising:
determining, when activated, a speed at which the mobile device is travelling;
the speed sensor being activated in response to a monitor identifying that the mobile device may be travelling at a speed in excess of the initial threshold using a motion indicium other than speed determined by a speed sensor.

34. The non-transitory computer-readable medium of claim 33, comprising computer-readable and computer-executable instructions which cause the processor to deactivate the speed sensor when it determines that the mobile device is travelling at a speed less than a second threshold.

35. A non-transitory computer-readable medium in a monitor associated with a mobile device, the medium having stored thereon, computer-readable and computer-executable instructions which, when executed by a processor, cause the processor to perform steps comprising:
identifying that the mobile device may be travelling at a speed in excess of an initial threshold using a motion indicium other than speed determined by a speed sensor and thereafter activating the speed sensor for determining a speed at which the mobile device is travelling.

* * * * *

UNITED STATES PATENT AND TRADEMARK OFFICE
CERTIFICATE OF CORRECTION

PATENT NO. : 8,355,751 B2  Page 1 of 1
APPLICATION NO. : 12/388006
DATED : January 15, 2013
INVENTOR(S) : David Blaine Dietz et al.

It is certified that error appears in the above-identified patent and that said Letters Patent is hereby corrected as shown below:

On the title page item (75), "Perry Jarmuszewskl" should read --Perry Jarmuszewski--.
On the title page item (57), Abstract, line 2 "using an speed sensor" should read --using a speed sensor--.

In the Specifications:
At column 1, line 18, "techniques if the radio channel" should read --techniques of the radio channel--.
At column 2, line 46, "but not limited to correlating" should read --but not limited to: correlating--.
At column 7, line 15, "two curves 210 depict an" should read --two curves 210 depict a--.
At column 17, line 3, "wireless RE Access Points" should read --wireless RF Access Points--.
At column 19, line 62, "know to one" should read --known to one--.
At column 20, line 56, "either an direct or indirect" should read --either a direct or indirect--.
At column 22, line 4, "According to an sixth" should read --According to a sixth--.

Signed and Sealed this
Eighteenth Day of June, 2013

Teresa Stanek Rea
*Acting Director of the United States Patent and Trademark Office*